May 26, 1970  J. E. McWILLIAMS  3,513,991
APPARATUS FOR LOADING BAGGED MAIL FROM A LOADING
DOCK INTO A HIGHWAY VEHICLE
Filed July 10, 1968  4 Sheets-Sheet 3

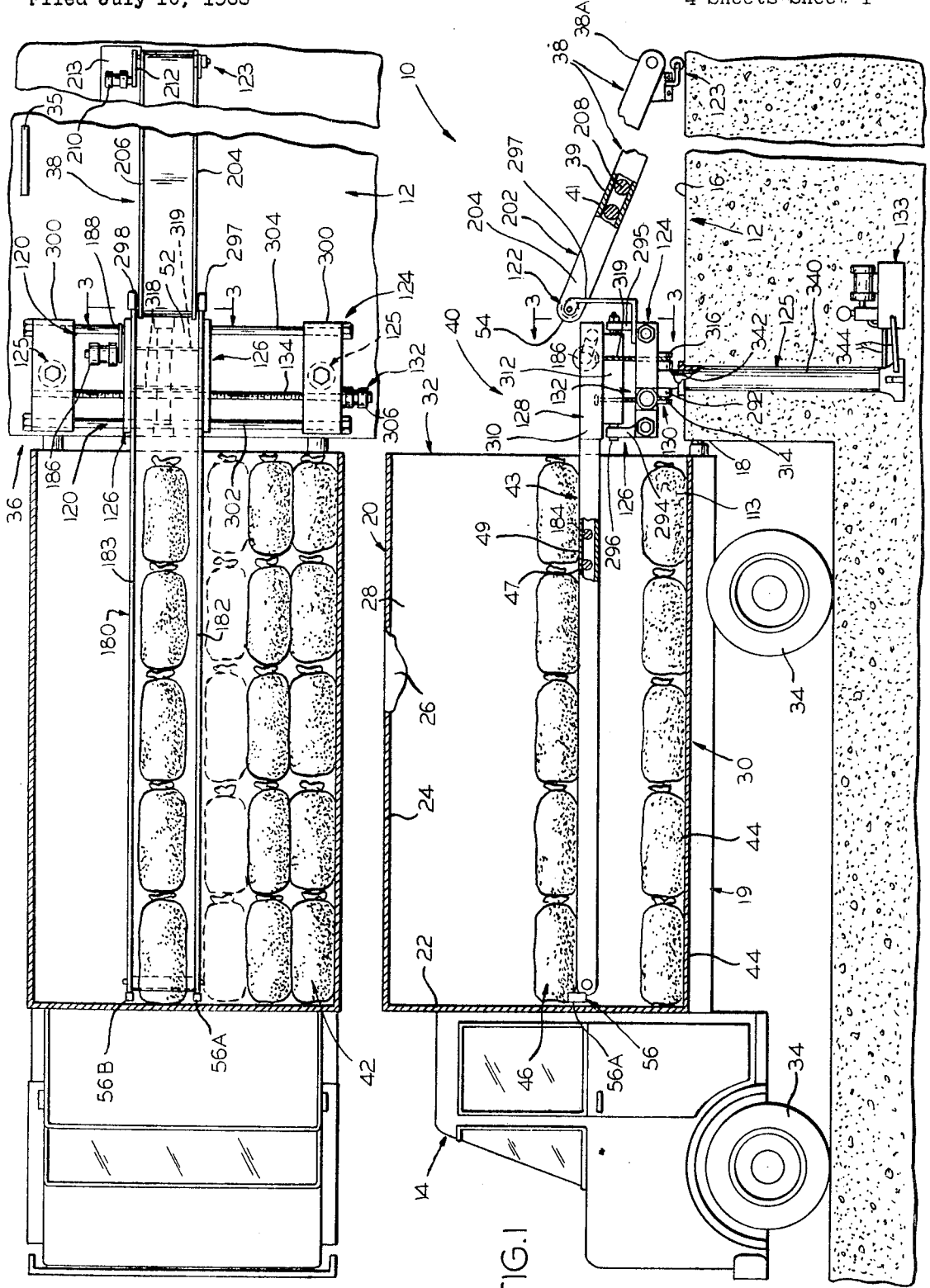

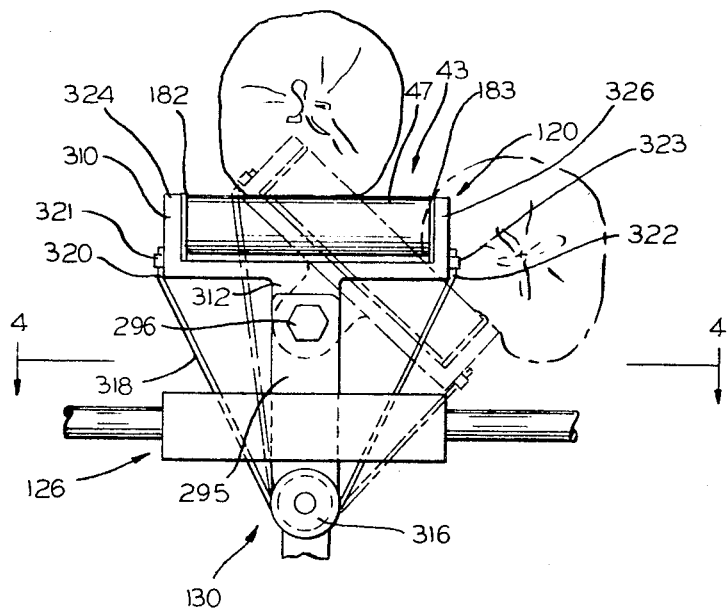
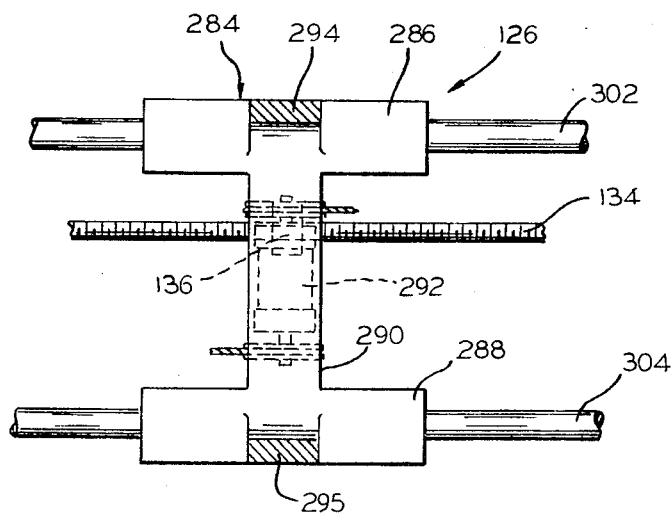

INVENTOR
JOSEPH E. McWILLIAMS

BY
Mann, Brown & McWilliams
ATTORNEYS

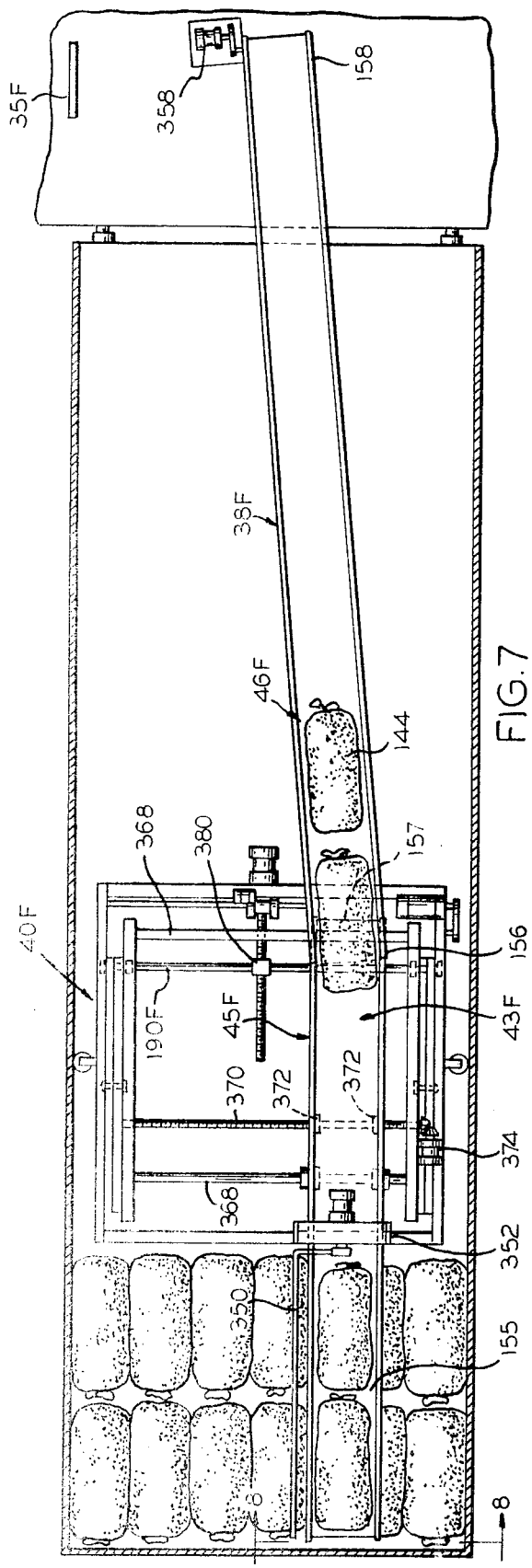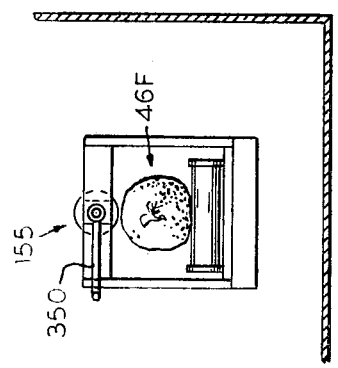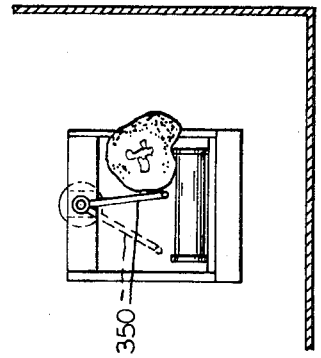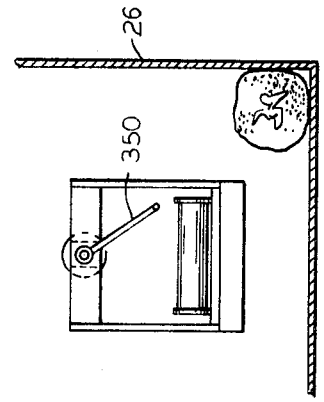

United States Patent Office 3,513,991
Patented May 26, 1970

3,513,991
APPARATUS FOR LOADING BAGGED MAIL FROM A LOADING DOCK INTO A HIGHWAY VEHICLE
Joseph E. McWilliams, 1345 Canterbury Lane, Glenview, Ill. 60025
Continuation-in-part of application Ser. No. 694,151, Dec. 28, 1967. This application July 10, 1968, Ser. No. 743,892
Int. Cl. B65g 67/08, 57/112
U.S. Cl. 214—6                                 14 Claims

ABSTRACT OF THE DISCLOSURE

The invention relates to the loading of mail bags from a loading dock into an end loading highway vehicle, such as a truck, to fully load the vehicle, where desired, with stacks of mail bags in which the bags are compactly loaded into place in individual stack forming tiers without those performing the bag loading operation having to enter the vehicle. In practicing the invention, the loading dock at the post office or the like is provided with an assembling conveyor on which out-going bags are placed and oriented in closely spaced single file tier form and operating between the conveyor and the highway vehicle is a tilting loading conveyor in the form of a belt conveyor secured in cantilevered relation on a support frame that is in turn tiltably mounted on a carrier riding on trackways mounted on the dock, with the tilting conveyor being so positioned on the dock and proportioned that it projects into the vehicle substantially up to the forward end of its loading area when the vehicle is backed into loading position adjacent the dock. The tilting conveyor receives the bags in single file form up to the number needed to make a stack forming tier unit that will extend lengthwise of the vehicle, and without disturbing the orientation of the bags, and disposes the tier load in the vehicle loading area for discharge of the stack forming tier unit; placement of the tier as part of a stack in the vehicle is effected by tilting the conveyor to one side or the other, again without disturbing the orientation of the bags. Other tier loads of the same type, are applied to the conveyors to complete the loading operation, the carriage being moved sidewise of the vehicle and conveyors to dispose the tier loads as necessary in different positions laterally of the vehicle.

The movements of the conveyors are controlled laterally and vertically of the highway vehicle so that the individual tier loads are formed into vertical stacks of mail bags that are disposed to position the bags of adjacent stacks in closely spaced relation, with the vehicle being thus filled with bags throughout its load receiving area so as to make maximum use of the available loading space within the vehicle to maximize the pay load. Alternately, the bags may be loaded on either side of a center aisle, which is left clear to facilitate manual unloading at local stops. The operation of the carriage is fully mechanized so that workers do not have to go into the vehicle, and palleting of the bags in groups is avoided while still achieving uniform loading in tier form.

In an alternate form, the loading conveyor is mounted on a carriage that moves into and out of the vehicle and discharge of the bags therefrom is effected by a swing arm arrangement associated with the loading conveyor to simultaneously discharge a bag tier into stack forming position in the vehicle loading area.

This application is a continuation-in-part of my application Ser. No. 694,151, filed Dec. 28, 1967.

This invention relates to a method and apparatus for loading bagged mail from a loading dock into a highway vehicle, and more particularly, to methods of and means for facilitating the handling of bagged mail in individual load groups for purposes of loading same into vehicles that are to transport it.

Conventional methods of loading mail bags into highway vehicles and trailers of the end loading type are not only time consuming and inefficient in nature, but also require much manual effort on the part of the workers involved. The bags are conventionally loaded so as to form vertical stacks in which the bags of each stack extend longitudinally of the vehicle and the stacks fill all available space vertically and lengthwise of the vehicle. The bags, which when loaded are from 12–14 inches wide and 36–40 inches long, are usually loaded up to about 92 inches above the floor of the truck in a space that is about eight feet wide, with the length depending on the length of the truck.

Heretofore the loading procedures have been largely manual in nature, with the workers involved dragging the individual bags into the vehicle from a pile of the bags on the adjacent loading dock, and then individually positioning and lifting the bag as is necessary to complete the formation of the respective bag stacks. At best, hand carts are sometimes employed to reduce some of the manual effort involved, but the handling required of each individual bag is still much the same; in both cases, much repetition of bag orienting movements is required for each bag, which is wasteful of efforts and inefficient in terms of the time and cost of getting the job done. The result is that valuable equipment is unduly tied up to accommodate these slow loading procedures, and labor is in short supply as workers are becoming increasingly reluctant to take on jobs involving such hard work.

Nevertheless, the Post Office Department and others concerned with the transport of loaded mail bags, load something on the order of 50,000 trucks a day in the U.S.A. in this manner at a cost on the order of $18.00 a truck, which gives an indication of the magnitude of the problem.

My Pat. 3,164,271, granted Jan. 5, 1965, discloses a basic system for handling bagged mail which involves the sorting and loading of incoming bags into tier load units that are grouped by destination and stored until arrival of a suitable load transport vehicle whereupon the tier load units are unloaded in single or multiple tier form in the vehicle.

A principal objective achieved by the methods and apparatus disclosed in said patent is that the mail bags are oriented early in the cycle of their handling operations and this initial orientation is maintained throughout all of the subsequent handlng operations.

The present application is directed to an additional modification of the basic arrangements shown in my said application.

A principal object of the present invention is to provide methods and apparatus for further facilitating the loading of end opening vehicles without requiring that the operator enter the transport vehicle or that the mail bags be palleted in groups to reduce individual handling.

Another principal object of this invention is to provide a method of loading bagged mail in transport vehicles in closely spaced relationship to the end that the available air spaced within the vehicle will be loaded to the maximum and all manual motions ordinarily required to handle the bags within the vehicle are performed by mechanical means arranged to carry, elevate as necessary and deposit the bags in the compact relationship necessary to maximize the pay load by substantially filling the available cubic loading space of the vehicle.

Another principal object of the invention is to provide methods and apparatus for loading of end opening vehicles such as motor trucks and trailers which permits a single operator to efficiently load the entire transport vehicle without stepping inside it.

Still other objects of the invention are to provide apparatus for loading bagged mail in transport vehicles that is adapted for full push button type actuation and control, to provide methods and apparatus for handling bagged mail that is especially adapted for application to smaller motor trucks and the like, and to provide mail bag handling apparatus that is economical of manufacture, convenient in use, and adapted for all conventional mail bag loading dock areas or their equivalents.

Other objects, uses, and advantages will be obvious or become apparent from a consideration of the following detailed description and the application drawings (in which like reference numerals indicate like parts throughout the several views).

In the drawings:

FIG. 1 is a diagrammatic side elevational view of a motor truck in the process of being loaded in accordance with my present invention, with the truck load receiving body being shown in section and the mail bag load unit receiving and depositing conveyor being shown with a load unit applied thereto for deposit on the floor of the truck;

FIG. 2 is a plan view of the apparatus shown in FIG. 1;

FIG. 3 is a fragmental cross-sectional view of the tilting conveyor, taken substantially along line 3—3 of FIGS. 1 and 2;

FIG. 4 is a fragmental sectional view of the conveyor carrier, taken substantially along line 4—4 of FIG. 3;

FIG. 7 is a plan view of the apparatus shown in FIG. 5;

FIG. 8 is a fragmental cross-sectional view along line 8—8 of FIG. 7; and

FIGS. 9 and 10 are similar to that of FIG. 8 illustrating the manner in which the bag tiers formed by practicing this embodiment are unloaded into place within the vehicle.

Figure 5:
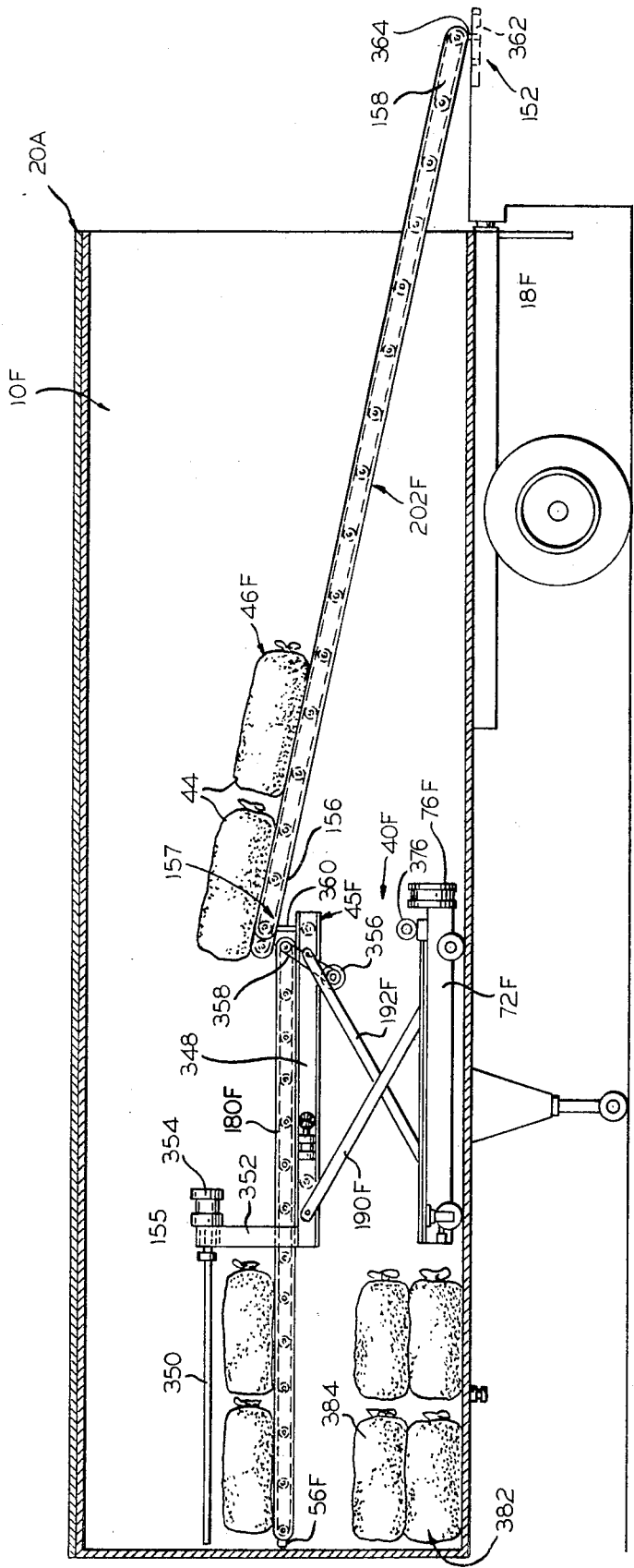
FIG. 5 is a view similar to that of FIG. 1 illustrating yet a further modified form of the invention.

However, it is to be distinctly understood that the specific embodiment of the invention illustrated is supplied primarily to comply with the requirements of the Patent Code, and that the invention may have other embodiments that will be obvious to those skilled in the art.

GENERAL DESCRIPTION

Reference numeral 10 of FIG. 1 generally indicates one embodiment of the present invention, that is closely related to the basic approach of my said application Ser. No. 694,151, for loading mail bags from a loading dock 12 into an end loading vehicle 14, which vehicle has been illustrated as being in the form of the familiar motor truck. Although this form of the invention is readily applicable to any end loading vehicle, it is especially suited for loading smaller vehicles, such as that illustrated, that may have a load carrying body of up to 20 feet in length.

It is assumed that the mail bag handling installation involved includes the loading dock 12 (of a post office or the like) that is conventionally provided with a level load support surface 16 and the usual shoulder or end 18 adjacent to which the vehicle 14 is backed up for purposes of being loaded.

It is also assumed that the vehicle 14 be in the form of the usual frame 19 having body 20 applied thereto in any suitable manner, with body 20 being defined by forward end wall 22, top wall 24, side walls 26 and 28, floor 30, and end opening 32 that is customarily closed by suitable doors or the like (not shown). The vehicle 14 rides on the usual wheels 34 and is provided with the usual motivating means for driving same.

In accordance with the form of FIGS. 1–4 of this invention, there is associated with the loading dock 12 at the position 36 where the vehicle body 14 is to be stationed for loading purposes a mail bag loading conveyor 38 and a tilting mail bag positioning and depositing conveyor apparatus 40, which receives mail bags that have been applied in single file form on conveyor 38, transports them into the vehicle 14, and discharges them in a tier form that extends longitudinally of the vehicle to form mail stacks 42 of which the bags are in end to end relation.

Under ordinary circumstances, the loading dock 12 is located at a post office or the like where loaded mail bags are processed for shipment to their destinations, and as indicated in FIG. 2, the conveyor 38 and the apparatus 40 are longitudinally aligned with the vehicle 14 (in the loading position of the vehicle). Apparatus 40 includes conveyor 43, and both conveyors 38 and 43 have a width transversely thereof to accommodate the mail bags 44 in single file form. Conveyor 43 has a length such that it will hold a row 46 of mail bags 44 that extends the length of the vehicle so that when deposited in the vehicle the row 46 will form a tier of bags that extends longitudinally of the vehicle. Conveyor 38 is in the form of conveyor belt 39 defining an upwardly facing load supporting surface 41 on which the bags 44 are placed, which surface, at least at the lower, loading end 38A of conveyor 38, is at an easy reach height above surface 16, such as two to three feet high.

The apparatus 40 comprises a load support in the form of a carrier or trolley 126 riding in trackways 120 defined by the vertically movable open centered, frame 124 mounted on a pair of hydraulic jack devices 125 with which loading dock 12 is equipped. Carrier 126 tiltably mounts a load support frame 128 on which conveyor 43 is mounted in cantilever relation. Frame 128 is tilted to either side under the control of drive arrangement 130 that is mounted on carrier 126. Carrier or trolley 126 is moved longitudinally of trackways 120 (and sidewise of vehicle 14) by drive arrangement 132 that includes screw member 134 journaled in frame 124 and cooperating with a nut device 136 (see FIG. 4) of carrier 126. Frame 124 is raised and lowered by operation of jack devices 125 under control of control mechanism 133 which is associated with loading dock 12 in any suitable manner.

The conveyor 38 further is in the form of a frame 202 including side members 204 and 206 between which are journaled the rollers 208 that support belt conveyor 39. Frame 202 is pivotally supported on carrier 126 as at 122, and as its lower end rides on rollers 123 at either side thereof to readily accommodate changes in the inclination and sidewise positioning of same as frame 124 is adjusted horizontally and vertically. Conveyor belt 39 is driven by suitable motor 210 mounted on support plate 213 fixed to frame 202 and driving the conveyor and pulley through suitable belt or chain 212.

Conveyor 43 comprises a suitable frame 180 including side plates 182 and 183 joined together in any suitable manner that journal rollers 184 that support conveyor belt 47 which defines load support surface 49. Belt conveyor 47 is driven by a suitable electric motor 186 that drives the conveyor end pulley through suitable pulley belt or chain 188.

In practicing my invention, the mail bags are brought in any suitable manner to the area of the conveyor 38 and they may be piled at random adjacent the conveyor 38 for ready access by one or more workers stationed adjacent the conveyor 38 for purposes of controlling the operation of same and carriage 40. In accordance with this invention, the controls for conveyor 38 and apparatus 40 are arranged so that these pieces of equipment are operated without anyone having to go into the vehicle 14, as will be hereinafter described in connection with the embodiment of the invention illustrated in the drawings. For this purpose, the controls may be of the push button type applied to suitable control panel 35 and may be of any suitable electric and/or electronic type that will serve the purpose.

To practice my invention, after the vehicle 14 is positioned as shown in FIGS. 1 and 2 for loading (assuming it is empty), and the bags to be shipped are disposed, for instance in a pile or piles adjacent the conveyor 38, the frame 124 is positioned vertically at the position shown in FIG. 1 to dispose carrier 126 so that bags 44 dropping therefrom will have a free fall of no more than 24 inches to the floor 30 (which is the maximum permitted by Post Office Department regulations).

The conveyors 38 and 43 are then actuated and a series of bags 44 is applied in closely spaced consecutive order to conveyor 38 that is sufficient in number to form one tier 46 that extends the length of vehicle body 20. The bags 44 move in consecutive order onto conveyor 43 and are conveyed forwardly of vehicle 14 until the leading bag 44 interrupts electric eye 56, which through suitable circuiting associated with panel 35 stops conveyor 43 and actuates drive arrangement 132 to position conveyor 43 for dropping the first tier in place along one side of body 20, for example side 26. Drive arrangement 130 is then actuated automatically to tilt conveyor 43 in the manner suggested by FIG. 3 (but in the opposite direction) to drop the thus positioned tier in place, and then return conveyor 43 to its level position, whereupon the conveyors 38 and 43 automatically start up and the next tier is applied in like manner, drive arrangement 132 being actuated as before and arranged (by appropriate sequence controls built into the circuiting controlled at panel 35) to automatically position conveyor 43 in the position to drop the next tier load into place adjacent the first tier load on the floor 30 of vehicle body 20. Electric eye elements 56A and 56B are arranged to automatically retract below the top level of conveyor 43 after stopping same to accommodate the bag dumping operation, after which they automatically extend to their operative positions on reactuation of conveyor 43; this may be done in any suitable manner.

The next tiers are similarly handled to form a horizontally disposed layer 113 of tiers 46 along the floor 30 of vehicle body 20 across the width of the vehicle and extending between its forward wall 22 and its open end 32, except that for the tiers that are to go adjacent body side 28, the conveyor is tilted in the opposite direction. In doing this, the apparatus 40 is maintained at its initial elevation above the floor 30 of vehicle body 20 until this first bag layer 113 is fully in place between forward wall 22 and door opening 32, after which the frame 124 is raised, by operating mechanism 133 (preferably automatically through appropriate sequence controls built into the circuiting), into a position suitable for forming the next layer 113, which is formed in the manner described for the first layer 113. This is repeated until the vehicle is filled, to the extent desired, or permitted by the nature of apparatus 40, with the stacked tiers 46 forming vertical stacks 42 of bags 44 that extend longitudinally of the vehicle. The vehicle open end is then secured in the usual manner and the vehicle 14 driven off to be replaced by a similar vehicle 14 that is loaded in like manner.

Alternately, the operation of the bag loading apparatus can be controlled to so deposit the bags 44 in the tiers 46 that an aisle is left down the middle, or adjacent the middle of the vehicle body 14, so that the truck driver, when the truck body 20 is loaded, may readily enter the body 20 to obtain bags 44 destined for particular local stops (which bags would be appropriately positioned in the load for ready grasping and withdrawal from the vehicle). Such aisle formation can be achieved by appropriately operating the bag loading apparatus under suitable sequencing controls built into the circuiting controlled at panel 35.

Figure 6:
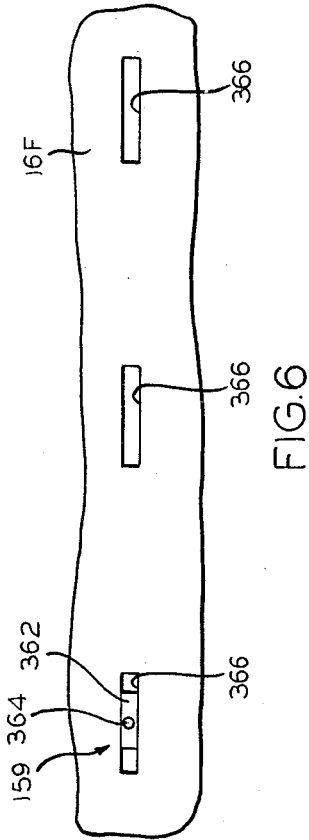
FIG. 6 is a fragmental plan view of a portion of the loading dock at the right of FIG. 5.

The embodiment of FIGS. 5–10 is adapted for loading full size semi-trailer bodies 20A of the type illustrated in my said application, which may have a length up to forty feet.

In the modified form (10F) of FIGS. 5–10, the carriage 40F is similar to carriage 40 of FIGS. 1 and 2 of my said application and carries a conveyor 43F that receives bags 44 in single row tier or load unit form, in which the bags of the tier or load unit 46F extend longitudinally of the vehicle, from conveyor 38F on which the tiers 46F are made up, and which is connected to carriage 40F, for supplying the bags thereto after carriage 40F has been positioned to unload tiers 46 sidewise of the vehicle to form the stacks of tiers in the vehicle. In this form of the invention, the bags are unloaded by employing the mechanism indicated at 155, and conveyor 43F is shifted sidewise of the vehicle to position same to drop off the next tier of bags (extending longitudinally of the vehicle) that is formed by operating conveyor 38F. In this particular form the parts are arranged so that a tier 46F made up of two bags extending longitudinally of the vehicle is accommodated for each bag loading position of carriage 40F. The end 156 of conveyor 38F is pivoted to conveyor 43F as at 157 to accommodate lateral shifting of conveyor 43F, and the other end 158 thereof is removably pivoted in the loading dock as at 159 at one of several pivoting locations (see FIG 6) that will define the several operating stations of carriage 40F required to fully load vehicle body 20A.

The handling of the bags in moving them from the conveyor 38 to their respective positions in the vehicle 14 is thus carried out after having made a single orientation of the bag as to the position it is to take in a particular stack forming tier, and without having to drop the bag over the 24 inch limitation provided for by the Post Office regulations.

From the description so far there are several important features to be observed. Note for one thing that the bags 44 are properly oriented in their tiers 46 by their application to the conveyors 38 or 38F, and that this orientation is maintained throughout the further handling of the bags that moves them into stacked relation in the vehicle 14. Furthermore, the lifting and positioning of the bags 44 onto conveyors 38 or 38F is the only manual labor involved, and the worker is concerned with only as easy lifting positioning action at a convenient working height above surface 16, with such action needing only to be performed once per bag.

It is also to be noted that the loading of the vehicle 14 is done without anyone having to enter the vehicle 14, and palletizing of the individual tiers 46 is unnecessary.

SPECIFIC DESCRIPTION

Referring now back to the embodiment of FIGS. 1–4, the frame 124 comprises a pair of cross members 300 joined together by bars 302 and 304 that define the respective trackways 120. Cross members 300 are each mounted on a separate jack device 125. Screw member 134 is journaled between cross members 300 and is driven by suitable electric motor 306 that forms a part of drive arrangement 132.

The carrier or trolley 126 comprises an H-shaped frame 284 including tubular leg portions 286 and 288 through which bars 302 and 304 are respectively slidably received, and a connecting portion 290 in which nut device 136 is mounted, and which carries the electric motor 292 that forms a part of drive arrangement 130. Frame 284 includes spaced upstanding lugs 294 and 295 that mount the pivot shaft 296 on which the load support frame is tiltably mounted. Spaced angled arms 297 and 298 between which conveyor 38 is pivoted (as at 122) are secured to frame 284 in any suitable manner, and are shaped to space and position the discharge end 54 of conveyor 43 to allow the tilting motion of conveyor 43 that is desired and yet permit ready transfer of the bags 44 between these two conveyors.

Load support frame 128 comprises a channel shaped structure 310 of any suitable type having a lug portion 312 underneath same that is bored to receive the pivot shaft 296. Motor 186 is secured to frame 128 in any suitable manner, and is omitted from the showing of FIG. 3 to avoid undue complication. It should be proportioned and positioned to avoid interference with the frame member 300 at its side of apparatus 40; the indicated member 300 may be indented downwardly to serve this purpose.

The drive mechanism 130 comprises electric motor 292 that drives pulleys 314 and 316 at either end thereof in synchronism, with the respective pulleys 314 and 316 having looped thereabout the respective cables 318 and 319 that have their respective ends 320 and 322 anchored in any suitable manner, as at 321 and 323, to the respective side portions 327 and 326 of structure 310. Motor 292 is adapted to be driven in opposite directions with the result that the pulleys 314 and 316 wind themselves along the respective cables 318 to pivot the frame 126 about the axis of shaft 296. Appropriate sequencing and positioning controls are built into the controls for motor 292 to automatically position pulleys 314 and 316 with respect to cables 318 and 319 such that conveyor 43 will be returned to the illustrated load supporting horizontal position after each load dumping operation.

Jack devices 125 each comprise a hydraulic cylinder 340 that is mounted in dock 12 in any suitable manner, each of which includes piston member 342 that is fixed to the respective cross members 300 of frame 124 in any suitable manner. Mechanism 133, which is illustrated in largely block diagram form, includes a suitable motor, pump, source of hydraulic liquid, conduiting, and the like to raise frame 124 by supplying hydraulic liquid to the lower ends of the respective cylinders 340 through conduits 344, as may be necessary under the control of the operator at panel 35 to position frame 124 at the desired elevation to form the mail bags into the superposed horizontal rows 113 for the full loading height of the vehicle 14.

The operation and movements of the conveyors 38 and 43 are preferably completely controlled from a control panel 35, or the like, located outside of the vehicle 14 on dock 12, through any suitable wiring arrangement that incorporates the various motors and switches that have been referred to, and ordinarily only a single operator will be needed to both load the bags on the dock supported conveyor 38 and operate the machines involved to deposit the bags in the vehicle 14. The machines involved can readily be controlled to avoid dropping the bags further than the 24-inch limitation prescribed by the Post Office Department.

Referring now to the embodiment of FIGS. 5–10, the wheeled frame 72F of carriage 40F is the same as frame 72 of said application with its cross-levers 190F and 192F operating in suitable ways formed in vertically movable platform 45F on which belt conveyor 43F is operably mounted. Conveyor 43F is arranged similar to conveyor 43 and includes limit switch 56F that is similar in purpose to switch 56 of said application in serving to stop forward movement of carriage 40F. Unloading mechanism 155 comprises swing arm 350 journaled in support 352 carried by frame 45F and operated by suitable motor 354 from central board 35F. Conveyor 43F is operated by suitable motor 356 through suitable pulley belt or chain 358 and conveyor 38F, which is arranged in a manner similar to conveyor 38, is similarly operated through suitable motor 358 (suitably supported by frame 202F). The frame 202F of conveyor 38F includes vertical pin structure 360 that is suitably journaled in platform 45F.

At the end 158 of conveyor 38F, the pivotal connection 159 comprises an elongated plate member 362 pivotally connected to vertical pin structure 364 that is fixed to frame 202F, and is adapted to seat in one of the slots 366 formed in dock surface 16F at a suitable unloading station or position for carriage 40F. The frame 180F of conveyor 43F is mounted for sidewise movement on support bars 368 of frame 45F and is adapted to be moved sidewise of the vehicle by rotating screw 370 journaled in frame 45F that cooperate with nuts 372 secured to frame 45F. Screw 370 is rotated by suitable motor 374. Frame 45F is raised and lowered by operating motor 376 to rotate screw 378 journaled in frame 72F and cooperating with a suitable nut structure 380 operably connected to cross lever 190F.

The embodiment of FIGS. 5–10 is operated by using motor 76F to drive carriage 40F into the empty vehicle body 20A, with the conveyor 38F and its end 158 supported above the dock surface 16F in any suitable manner. When limit switch 56F engages the vehicle forward wall, forward motion of carriage 40F ceases, it remains stationary, and the plate 362 of conveyor 38F is entered in the slot 366 nearest dock end 18F. Conveyor 43F is then positioned to one side of vehicle body 20 to drop the first tier 46F into place (see FIG. 8) and the two bags forming this tier are applied to conveyor 38F and conveyed to the unloading position indicated by FIGS. 7 and 8, whereupon swing arm 350 is swung between the positions of FIGS. 8 and 10 to drop the first tier 46F into loaded position (FIG. 10). This action is repeated with conveyor 43F being moved transversely of the vehicle as is necessary to form the first layer 382 of bags at the inner end of the vehicle body 20; to drop the last tier or two on the side of the vehicle opposite that shown in FIGS. 8–10, the conveyor 43F and swing arm 350 are positioned and operated to drop the tier off the other side of conveyor 43F to fill the space between the vehicle side wall 28 and the bags already in place. The next layer 384 of bags is stacked on top of the first layer 382 by repeating the operations just described with conveyor 43F elevated as is necessary to bring the additional bags over those already in place. After the vehicle has been loaded vertically to the capacity permitted by apparatus 10F, the carriage 40F is moved rearwardly to its next loading position, wherein the pivot plate of conveyor 38F is seated in the next slot 366, and the loading operations repeated. This continues until loading of the vehicle 14 is completed. As conveyor 43F shifts laterally of the vehicle, conveyor 38F swings with it and plate 362 shifts longitudinally of the slot 366 in which it is seated.

For all embodiments of the invention, the operations of the conveyors, bag carrying carriages and motors are operated from a control panel 35 or 35F, or the like, located outside of the vehicle, through any suitable wiring arrangement, and ordinarily only a single operator will be needed to both load the bags on the dock supported conveyor and operate the machines to deposit the bags in the highway vehicle. The machines can readily be controlled to avoid dropping the bags further than the 24 inch limitation prescribed by the Post Office Department.

The bag stacking arrangement of this invention will load trucks and trailers in a fraction of the time now required and at less than half the cost, while at the same time greatly reducing the effort required by workers handling the bags. This not only greatly reduces the tie up time for each truck, but also significantly reduce sthe overall cost of mail bag handling.

As to all described embodiments and methods herein disclosed, the load units or tiers formed on the conveyor 43 are termed "partial transport vehicle load depth unit" in the appended claims.

The foregoing description and the drawings are given merely to explain and illustrate my invention and the invention is not to be limited thereto, since those skilled in the art who have my disclosure before them will be able to make modifications and variations therein without departing from the scope of the invention.

I claim:

1. In bulk mail handling apparatus for loading elongated mail bags from a loading dock into the load receiving area of an end loading transport vehicle backed into load receiving position adjacent the dock to dispose its end opening to receive the bags, without workers on the dock handling the bags having to enter the vehicle, and without requiring that pallets remain with the bags after they are loaded into the vehicle, said apparatus comprising:

a vertically movable horizontally disposed frame positioned in alignment with said load receiving position of the vehicle, said frame comprising:

an elongate mail bag loading conveyor having a width approximating the width of the mail bags, and means mounting same for movement laterally of the vehicle, a mail bag unit load assembling conveyor positioned on the loading dock and disposed to receive mail bags at one end thereof placed thereon from the loading dock and convey them in consecutive manner onto said mail bag loading conveyor, said mail bag assembling conveyor having a width approximating the width of the mail bags, said mail bag assembling conveyor at said one end thereof being adapted to rest on the loading dock at an elevation for convenient manual lifting of the bags from the dock onto same, and at the other end thereof being mounted on said frame to dispose said other end thereof in mail bag transferring relation to said mail bag loading conveyor, means for disposing said mail bag loading conveyor within the vehicle when the latter is in its load receiving position, means for adjusting vertically said frame for adjusting vertically said mail bag loading conveyor, and means for simultaneously discharging from said mail bag loading conveyor all the bags of a unit load of bags received thereon from said assembling conveyor to dispose such bags in a tier forming row extending longitudinally of the vehicle, said discharging means including means for selectively discharging a load unit received thereon from either side of said loading conveyor for disposing tier forming rows of the bags adjacent the respective side walls of the vehicle, whereby mail bags may be loaded onto said assembling conveyor with the bags thereof oriented to extend longitudinally of the vehicle and transferred to said loading conveyor to form a tier of bags, and said tier of bags may be mechanically transferred between said loading conveyor and a stack forming position in said vehicle area at selected locations between and adjacent the vehicle side walls while maintaining said orientation.

2. The apparatus set forth in claim 1 wherein:

said assembling conveyor is pivotally connected to said frame adjacent the discharge end of said assembling conveyor, with the loading end of said assembling conveyor being supported on the dock at an elevation for convenient manual lifting of the bags from the dock onto same.

3. In bulk mail handling apparatus for loading elongated mail bags from a loading dock into the load receiving area of an end loading transport vehicle backed into load receiving position adjacent the dock to dispose its end opening to receive the bags, without workers on the dock handling the bags having to enter the vehicle, and without requiring that pallets remain with the bags after they are loaded into the vehicle, said apparatus comprising:

a vertically movable horizontally disposed frame mounted on the loading dock adjacent said load receiving position of the vehicle, said frame comprising:

an elongate mail bag loading conveyor having a width approximating the width of the mail bags and proportioned lengthwise thereof to extend into the vehicle when same is in its said load receiving position and project substantially to the forward end of the load receiving area thereof, and means mounting said loading conveyor for movement laterally of the vehicle, a mail bag unit load assembling conveyor positioned on the loading dock and disposed to receive mail bags at one end thereof placed thereon from the loading dock and convey them in consecutive manner onto said mail bag loading conveyor, said mail bag assembling conveyor having a width approximating the width of the mail bags, said mail bag assembling conveyor at said one end thereof being adapted to rest on the loading dock at an elevation for convenient manual lifting of the bags from the dock onto same and at the other end thereof being mounted on said frame to dispose said other end thereof in mail bag transferring relation to said mail bag loading conveyor, means for adjusting vertically said frame for adjusting vertically said mail bag loading conveyor, and means for simultaneously discharging from said mail bag loading conveyor all the bags received thereon from said assembling conveyor to dispose such bags in a tier forming row extending longitudinally of the vehicle, said discharging means including means for selectively discharging a load unit received thereon from either side of said loading conveyor for disposing tier forming rows of the bags adjacent the respective side walls of the vehicle, whereby mail bags may be loaded onto said assembling conveyor with the bags thereof oriented to extend longitudinally of the vehicle and transferred to said loading conveyor to form a tier of bags, and said tier of bags may be mechanically transferred between said loading conveyor and a stack forming position in said vehicle area at selected locations between and adjacent the vehicle side walls while maintaining said orientation.

4. The apparatus set forth in claim 3 wherein:

said assembling conveyor is pivotally connected to said frame adjacent the discharge end of said assembling conveyor, with the loading end of said assembling conveyor riding on roller means engaging the dock.

5. The apparatus set forth in claim 3 wherein:

said discharging means comprises:

means for mounting said loading conveyor for tilting movement about an axis extending longitudinally thereof and underneath same, and means for selectively tilting said loading conveyor about said axis or maintaining same in an upright position.

6. The apparatus set forth in claim 3 wherein:

said mounting means comprises said frame including guide means extending transversely of said loading conveyor, said conveyor being mounted on said guide means, and power means cooperating between said frame and said conveyor to selectively shift said conveyor laterally thereof to dispose said loading conveyor to discharge the bag tier in said vehicle at a desired location transversely thereof.

7. In bulk mail handling apparatus for loading elongated mail bags from a loading dock into the load receiving area of an end loading transport vehicle backed into load receiving position adjacent the dock to dispose its end opening to receive the bags, without workers on the dock handling the bags having to enter the vehicle, and without requiring that pallets remain with the bags after they are loaded into the vehicle, said apparatus comprising:

a vertically movable horizontally disposed frame adapted to be positioned on the loading dock adjacent said load receiving position of the vehicle, said frame comprising:

an elongate mail bag loading conveyor having a width approximating the width of the mail bags and having a length capable of receiving at least two of the mail bags end to end, a carriage adapted to operate on the dock between the dock and the load receiving position of the vehicle and proportioned to enter the vehicle end opening, means for mounting said loading conveyor on said carriage for longitudinal movement therewith for shifting movement laterally of the vehicle, a mail bag unit load assembling conveyor positioned on the loading dock and disposed to receive mail bags at one end thereof placed thereon from the loading dock and convey them in consecutive manner onto said mail bag loading conveyor, said mail bag assembling conveyor having a width approximating the width of the mail bags, said mail bag assembling conveyor at said one end thereof being adapted to rest on the loading dock and at the other end thereof being mounted on said frame to dispose said other end thereof in mail bag transferring relation to said mail bag loading conveyor, said assembling conveyor being positioned to be aligned with the vehicle and its end opening in the load receiving position of the vehicle, said assembling conveyor presenting an upwardly facing load transporting surface having at least a portion thereof at an elevation for convenient manual lifting of the bags from the dock onto the conveyor surface, means for moving said carriage from the dock into the vehicle to move said loading conveyor into selected load discharging positions in the vehicle area, means for adjusting vertically said frame for adjusting vertically said loading conveyor, and means for simultaneously discharging from said loading conveyor all the bags received thereon from said assembling conveyor to dispose such bags in a tier forming row extending longitudinally of the vehicle, whereby mail bags may be loaded onto said assembling conveyor with the bags thereof oriented to extend longitudinally of the vehicle and transferred to said loading conveyor to form a tier of bags, and said tier of bags may be mechanically transferred between said loading conveyor and a stack forming position in said vehicle area while maintaining said orientation.

8. The apparatus set forth in claim 7 wherein:

said assembling conveyor is pivotally connected to said frame adjacent the discharge end thereof, with the loading end of said assembling conveyor being supported on the dock at an elevation for convenient manual lifting of the bags from the dock into same, with the dock including spaced support locations spaced apart longitudinally of said loading conveyor at which said assembling conveyor loading end may be disposed to locate said loading conveyor at selected unloading positions within the vehicle.

9. The apparatus set forth in claim 7 wherein:

said discharging means comprises:

a swing arm carried by said frame, and means for swinging same against one side of a bag tier on said loading conveyor to simultaneously discharge the bag tier from one side of said loading conveyor onto the vehicle loading area.

10. The apparatus set forth in claim 7 wherein:

said mounting means comprises said frame including guide means extending transversely of said loading conveyor, said conveyor being mounted on said guide means, and power means cooperating between said frame and said conveyor to selectively shift said conveyor laterally thereof to dispose said loading conveyor to discharge the bag tier in said vehicle at a desired location transversely thereof.

11. The apparatus set forth in claim 1 wherein:

said means for vertically adjusting said frame comprises:

lift means carried by the loading dock, said frame being mounted on said lift means, and means for actuating said lift means to raise and lower said frame between predetermined load discharging positions of said carriage.

12. A bulk mail handling method for loading elongated mail bags from a loading dock into the load receiving area of an end loading transport vehicle backed into load receiving position adjacent the dock to dispose its end opening to receive the bags, without workers on the dock handling the bags having to enter the vehicle and without requiring that pallets remain with the bags after they are loaded into the vehicle, which method comprises:

forming a partial transport vehicle load depth unit made up of a plurality of said bags arranged in tier form in closely spaced end to end relation with the tier extending longitudinally of the vehicle and the bags of the tier oriented to extend longitudinally of said vehicle and with the tier oriented to be aligned with the vehicle end opening longitudinally of the vehicle, mechanically feeding said unit into and longitudinally of the vehicle load receiving area to the inner end thereof while maintaing said orientation, mechanically depositing the entire load unit by shifting it to either side transversely of its direction of infeed and free of any supporting pallet in said area while maintaining said orientation to form a stack tier extending longitudinally of the vehicle, forming a like mail bag load unit of additional mail bags similarly oriented with respect to the vehicle, mechanically moving said like unit into said load receiving area adjacent the first mentioned unit while maintaining said orientation thereof, depositing the said like unit adjacent the first mentioned unit, and similarly forming, moving and depositing subsequent like load units of additional mail bags to form a vehicle load of closely spaced multiple tier stacks of said mail bags within the vehicle.

13. The method set forth in claim 12 in which:

said multiple tier stacks are formed to extend consecutively from one side of the vehicle to the other, and wherein said units are each made up of sufficient bags to extend the length of the vehicle area.

14. The method set forth in claim 12 wherein:

said multiple tier stacks are formed to define an aisle extending along the midportion of the vehicle area and lengthwise of the vehicle.

References Cited

UNITED STATES PATENTS

| | | |
|---|---|---|
| 2,208,208 | 7/1940 | Brooks _____ 214—41 X |
| 2,755,945 | 7/1956 | Gilson. |
| 2,870,922 | 1/1959 | Thomson. |
| 3,176,858 | 4/1965 | Johnson. |
| 3,381,828 | 5/1968 | Sheehan. |

FOREIGN PATENTS

| | | |
|---|---|---|
| 157,755 | 7/1954 | Australia. |
| 116,200 | 1/1959 | U.S.S.R. |
| 1,278,535 | 10/1961 | France. |

GERALD M. FORLENZA, Primary Examiner

R. J. SPAR, Assistant Examiner

U.S. Cl. X.R.

198—88, 185; 214—41, 152